(12) United States Patent
Meissner

(10) Patent No.: US 7,263,903 B2
(45) Date of Patent: Sep. 4, 2007

(54) METHOD AND DEVICE FOR OPERATING A VEHICLE

(75) Inventor: Peter Meissner, Kernen I.R. (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 11/211,999

(22) Filed: Aug. 24, 2005

(65) Prior Publication Data

US 2006/0048585 A1    Mar. 9, 2006

(30) Foreign Application Priority Data

Sep. 1, 2004    (DE) .................. 10 2004 042 273

(51) Int. Cl.
*G01L 3/00*    (2006.01)

(52) U.S. Cl. ................................. 73/862.326

(58) Field of Classification Search ........... 73/862.326, 73/862.329, 118.1
See application file for complete search history.

(56) References Cited

U.S. PATENT DOCUMENTS

| | | | |
|---|---|---|---|
| 4,899,596 A * | 2/1990 | Janik et al. ............. | 73/862.329 |
| 5,726,353 A * | 3/1998 | Matsuda et al. ........... | 73/118.1 |
| 6,694,828 B1 * | 2/2004 | Nicot ..................... | 73/862.326 |

* cited by examiner

*Primary Examiner*—Jewel Thompson
(74) *Attorney, Agent, or Firm*—Kenyon & Kenyon LLP

(57) ABSTRACT

A method and a device for operating a vehicle allow a torque of the vehicle during operation of the vehicle to be measured. A torsional angle at at least one drive shaft of the vehicle is measured, and the torque transmitted via the at least one drive shaft is ascertained as a function of the measured torsional angle.

10 Claims, 2 Drawing Sheets

METHOD AND DEVICE FOR OPERATING A VEHICLE

BACKGROUND INFORMATION

Methods and devices are known for operating a vehicle in which a torque of the vehicle is ascertained.

Today an engine control unit manages the drive train of the vehicle. Not only are the driver's intentions detected and the engine of the vehicle correspondingly controlled, but also torque requirements or limits of other components of the drive train, such as the driving dynamics control or the vehicle transmission, are taken into account. The engine control unit calculates the torque at various locations on the drive train of the vehicle, such as at the output from the engine, the output from the transmission, and/or at a wheel of the vehicle. These torques are measured during an application phase and stored in characteristic maps. The actual torque present is no longer measured during operation of the vehicle.

SUMMARY OF THE INVENTION

The method and the device according to the present invention for operating a vehicle have the advantage that a torsional angle is measured at at least one drive shaft of the vehicle, and that the torque transmitted via the at least one drive shaft is ascertained as a function of the measured torsional angle. In this manner it is possible to measure a torque of the vehicle during operation of the vehicle. In addition, a comparison between a predetermined setpoint torque and the actual torque present is thus simpler, requires less expenditure, and is more reliable. It is therefore possible to track the actual torque more precisely, even when an adjustment is made to the predetermined setpoint torque. Furthermore, suitable monitoring may be used to ensure that the actual vehicle torque does not undesirably increase beyond a predetermined threshold value.

It is particularly advantageous when a first phase at a transmission output shaft of the vehicle is ascertained, a second phase at at least one wheel drive shaft of the vehicle is ascertained, and the torsional angle is ascertained from the phase displacement between the first phase and the second phase. It is thus possible to measure a vehicle torque present on the transmission output side in a particularly simple manner.

A further advantage results when a third phase at a first wheel drive shaft of the vehicle is ascertained, a fourth phase at a second wheel drive shaft of the vehicle is ascertained, and the second phase is formed by averaging the values of the third phase and the fourth phase. In this manner, phase displacements between the phases ascertained at the two wheel drive shafts, resulting from cornering, for example, may also be taken into account. These phase displacements then are not able to interfere with the determination of the torque on the transmission output side.

This is particularly advantageous when a first wheel of the vehicle driven by the first wheel drive shaft is situated opposite the second wheel of the vehicle driven by the second wheel drive shaft.

A further advantage results when at least one of the phases is measured by a phase detector at a gearwheel on the corresponding drive shaft. The corresponding phase may thus be measured in a particularly simple manner, optionally using an already present phase detector, so that no additional expenditure is required for measuring the torque.

Furthermore, it is advantageous when the transmission output shaft and at least two wheel drive shafts are rigidly connected to one another, in particular via a differential. It is thus possible to ascertain a vehicle torque on the transmission output side in a particularly simple and reliable manner, using phase detectors already present at the transmission output shaft and at the at least one wheel drive shaft. A further advantage results when the torque is ascertained in proportion to the torsional angle in a first region of the torsional angle. It is thus possible to determine the torque in the first region of the torsional angle in a particularly simple manner from the measured torsional angle. If the ratio between torsional angles is not linear, this ratio may be linearized using a characteristic curve.

A further advantage is realized when a fixed value, in particular the value zero, for the torque is assigned to the torsional angle in a second region of the torsional angle. This takes into consideration the fact that a certain amount of play is present in the drive train at the zero crossing point of the torsional angle. In the corresponding second region of the torsional angle where this is the case, the torque may thus be determined in a particularly simple manner.

A further advantage results when the torque is ascertained from the torsional angle on a uniform time basis. This enables the torsional angle to be detected in an accurate and error-free manner, even for very small time differences between the measured phase signals.

DETAILED DESCRIPTION

Figure 1:
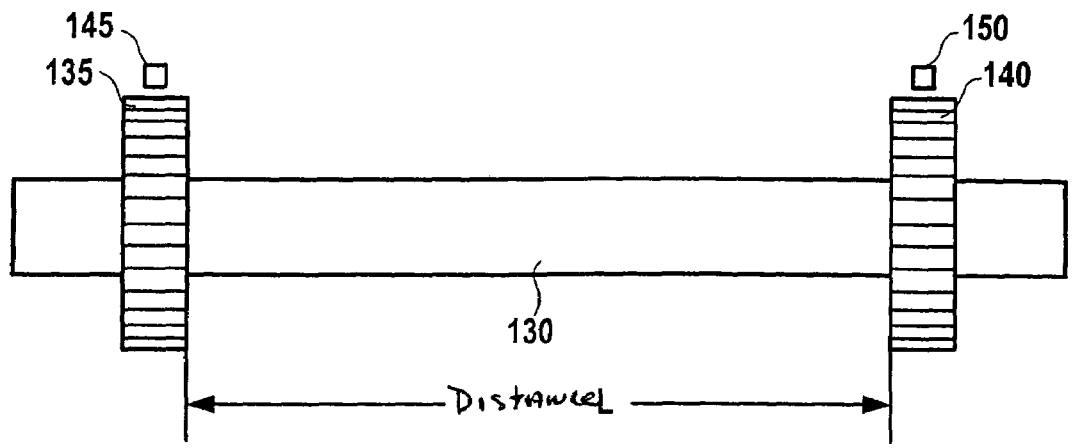
FIG. 1 shows a system having a shaft for describing the principle of torque measurement.

The principle of torque measurement is first explained according to FIG. 1. FIG. 1 shows a shaft, designated by reference number 130, having a first gearwheel 135 and a second gearwheel 140 separated by a distance L. One end of shaft 130 is driven, for example, by an engine, not illustrated in FIG. 1. A first phase detector 145 in the region of first gearwheel 135 measures the progression over time of the phase position of first gearwheel 135 in a manner known to those skilled in the art. A second phase detector 150 in the region of second gearwheel 140 measures the progression over time of the phase of second gearwheel 140, likewise in a manner known to those skilled in the art. Both phase detectors 145, 150 may be implemented, for example, inductively or by use of the Hall effect in a manner known to those skilled in the art. The described drive of shaft 130 transmits a torque via shaft 130, causing shaft 130 to twist. The difference between the two phase signals ascertained by the two phase detectors 145, 150 corresponds to the torsional angle present over length L. This torsional angle is proportional to the torque transmitted via shaft 130, and to distance L between the two gearwheels 135, 140 on shaft 130, according to the following equation:

$$phi = \frac{L}{GI}M \qquad (1)$$

where G is the torsional rigidity, I is the planar moment of inertia of the cross section of shaft 130, phi is the torsional angle corresponding to the described phase displacement between the two phase signals, and L is the distance between the two gearwheels 135, 140. Torsional rigidity G, also referred to as the shear modulus, and planar moment of inertia I of the shaft cross section are characteristic variables for shaft 130, and in this case may be assumed to be known in advance. These characteristic variables represent the proportionality constants in equation (1). M is the sought torque which is transmitted via shaft 130. After rearranging equation (1), one may solve for torque M as follows:

$$M = \frac{GI}{L}phi \qquad (2)$$

For long shafts, this proportionality according to equation (2) is used to measure the torque transmitted via the shaft. Distance L between the two gearwheels is likewise known, for example by measurement.

In a motor vehicle, a sufficiently long straight section of the drive shaft is not available in every case. Furthermore, additional sensors required solely for determining the torque should not be used, if possible. On the other hand, for example, for the case that the vehicle has an antilock braking system, rotational speed sensors are installed in the form of phase detectors on the drive wheels of the vehicle. The drive shafts of the vehicle, in turn, are rigidly connected to a transmission output shaft.

Figure 2:
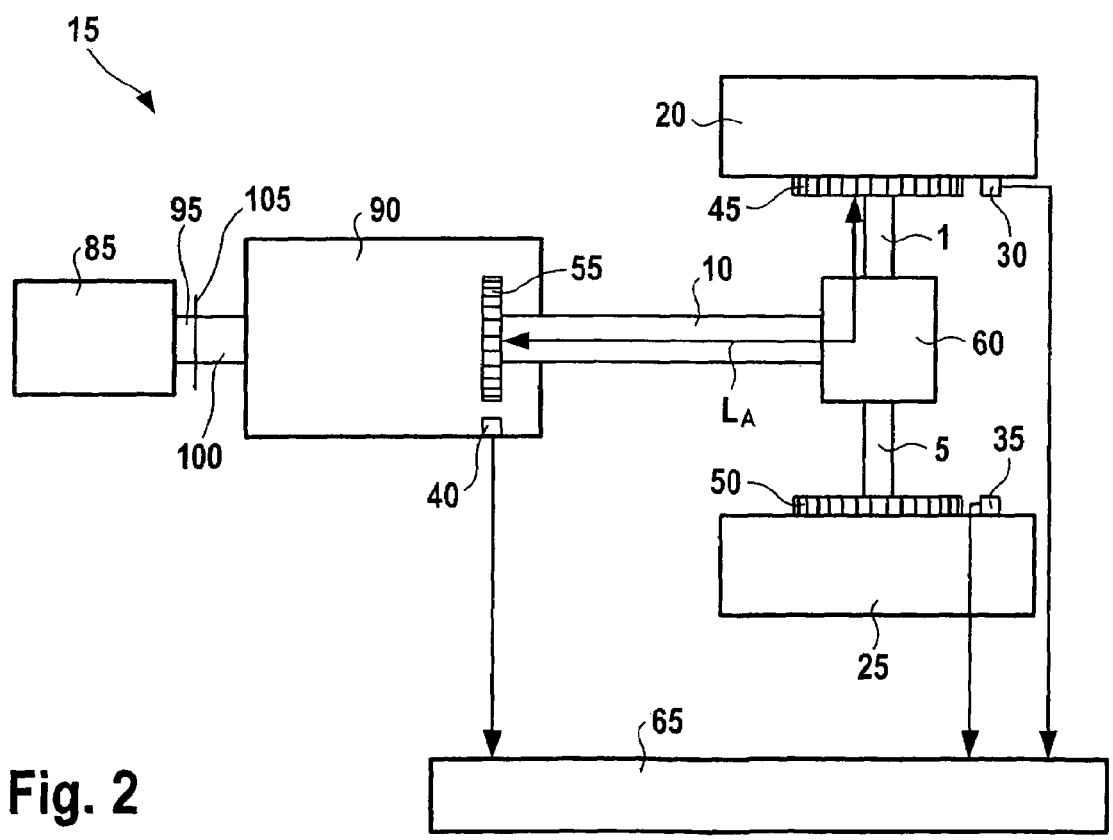
FIG. 2 shows a schematic view of a drive train of a vehicle for illustrating the torque measurement according to the present invention.

The drive train of the vehicle is schematically illustrated in FIG. 2, the vehicle being designated by reference number 15. The drive train illustrated in FIG. 2 includes an engine 85 which drives an engine output shaft 95 on the output side. Engine output shaft 95 is connected via a clutch 105 to a transmission input shaft 100, to which a transmission 90 is connected. On the output side, transmission 90 drives a transmission output shaft 10, which is rigidly connected via a differential 60 to a first wheel drive shaft 1 and a second wheel drive shaft 5. First wheel drive shaft 1 drives a first wheel 20 of the vehicle, and second wheel drive shaft 5 drives a second wheel 25 of the vehicle. According to FIG. 2, first wheel 20 of the vehicle which is driven by first wheel drive shaft 1 is situated opposite second wheel 25 of vehicle 15 which is driven by second wheel drive shaft 5. In the region of first wheel 20, a first gearwheel 45 is situated on first wheel drive shaft 1 for detecting the rotational speed. A first phase detector 30 likewise situated in the region of first wheel 20 detects the rotational speed of first wheel 20 from the rotation of first gearwheel 45 in the form of a first phase signal, and relays this first phase signal to an engine control 65. In the region of second wheel 25, a second gearwheel 50 is situated on second wheel drive shaft 5 which is used to determine the rotational speed of second wheel 25. To this end, a second phase detector 35, which detects the rotation of second gearwheel 50 and sends a second phase signal characterizing the rotational speed of second gearwheel 50 to engine control 65, is similarly situated in the region of second wheel 25.

Since both wheel drive shafts 1, 5 are rigidly connected via differential 60 to transmission output shaft 10, the drive torque of vehicle 15 on the transmission output side may be calculated using an additional third phase detector 40 in the region of transmission output shaft 10 and using the phase signals from the two phase detectors 30, 35 for the two wheels 20, 25 driven by wheel drive shafts 1, 5. Only additional third phase detector 40 in the region of transmission output shaft 10 is needed. This generally does not require any additional expenditure, because gearwheels are typically already provided in transmission 90, and only third phase detector 40 needs to be installed at transmission output shaft 10 in the region of a third gearwheel 55 of transmission 90. This third phase detector 40 is even already present in some transmissions, because a transmission control device, not illustrated in FIG. 2, requires rotational speed information at the output of transmission 90 for controlling the gear ratio, or because use of such a phase detector allows the speed of the vehicle to be measured in a manner known to those skilled in the art. Thus, according to FIG. 2, third phase detector 40 is situated at the output of transmission 90 in the region of third gearwheel 55 of the transmission output shaft and uses the rotation of third gearwheel 55 to detect a third phase signal which is also fed to engine control 65. In the example described in this case, transmission output shaft 10 and the two wheel drive shafts 1, 5 in general represent a drive shaft for vehicle 15.

Figure 3:
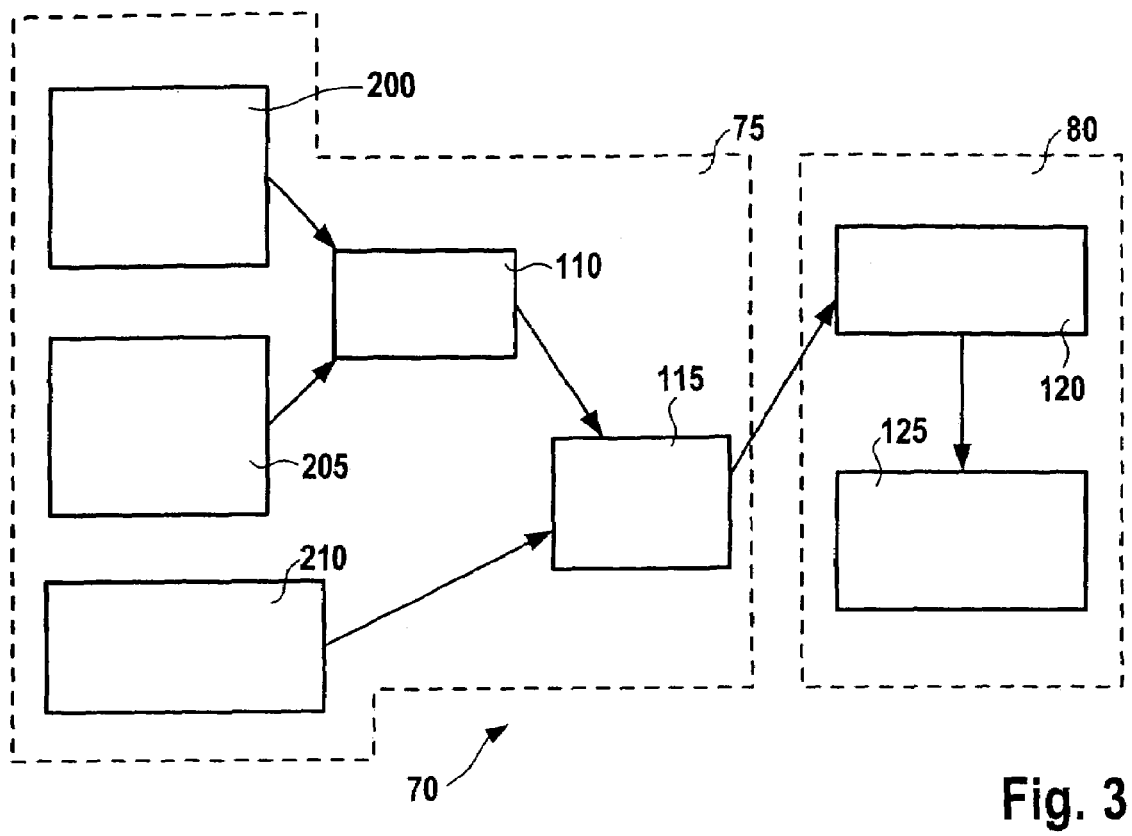
FIG. 3 shows a block diagram for explaining the method and the device for torque measurement according to the present invention.

FIG. 3 shows a block diagram for specifically explaining the method and the device according to the present invention. The block diagram may be implemented by software and/or hardware in engine control 65, or in another control unit. The block diagram represents a device 70 for ascertaining a torque $M_A$ of vehicle 15 on the transmission output side. Device 70 includes a measuring device 75 which measures a torsional angle $phi_A$ at at least one drive 1, 5, 10 of vehicle 15 on the transmission output side. In the present example it should be assumed that measuring device 75 measures torsional angle $phi_A$ on the transmission output side, between first gearwheel 45 and third gearwheel 55, or between second gearwheel 50 and third gearwheel 55. This occurs using the first, second, and third phase signals. The first phase signal is designated by reference number 200 in FIG. 3, and is fed to measuring device 75 by first phase detector 30. The second phase signal is designated by reference number 205 in FIG. 3, and is fed to measuring device 75 by second phase detector 35. The third phase signal is designated by reference number 210 in FIG. 3, and is fed to measuring device 75 by third phase detector 40. In particular when vehicle 15 is cornering, there are phase displacements in the two phase signals from first phase detector 30 and second phase detector 35 for both oppositely situated wheels 20, 25, i.e., between the inside wheel during cornering and the outside wheel during cornering. These two phase signals must therefore be ascertained in a suitable manner. For this purpose, first phase signal 200 and second phase signal 205 are fed to an averaging device 110 which generates a time-based average value of both phase signals 200, 205 and feeds this average value as a resulting phase signal to a subtraction device 115. Third phase signal 210 is also fed to subtraction device 115.

To ensure consistent numbering, third phase signal 210 is referred to below as a first phase, the resulting phase signal from averaging device 110 is referred to as a second phase, first phase signal 200 is referred to as a third phase, and second phase signal 205 is referred to as a fourth phase. Subtraction device 115 generates the absolute value of the difference between the first phase and the second phase. This difference represents torsional angle $phi_A$ on the transmission output side, which is provided at the output of measuring device 75. This torsional angle $phi_A$ on the transmission output side is fed to a determination unit 80 in device 70. Determination unit 80 includes a torque determination unit 120 which according to equation (2) calculates torque $M_A$ on the transmission output side from supplied torsional angle $phi_A$ on the transmission output side. Transmission output shaft 10 and first wheel drive shaft 1, for example, are considered as a resulting drive shaft on the transmission output side, it being assumed that first wheel drive shaft 1 and second wheel drive shaft 5 have approximately the same properties. Should the two wheel drive shafts 1, 5 differ, this must be taken into account by averaging device 10 by corresponding suitable weighting during averaging. Thus, for the resulting drive shaft on the transmission output side, values known in, advance for torsional rigidity $G_A$ and planar moment of inertia $I_A$ of the shaft cross section are stored in engine control 65. Similarly, the distance between third gearwheel 55 and first gearwheel 45 via transmission output shaft 10 and first wheel drive shaft 1 is known in engine control 65, which also corresponds to the distance between third gearwheel 55 and second gearwheel 50 via transmission output shaft 10 and second wheel drive shaft 5. This distance is designated as $L_A$ in FIG. 2. Alternatively, the resulting drive shaft on the transmission output side could be similarly modeled, taking into account the properties of second wheel drive shaft 5, or an average value of the properties of first wheel drive shaft 1 and second wheel drive shaft 5 with regard to the torsional rigidity, the planar moment of inertia of the shaft cross section, and the distance from third gearwheel 55 to first gearwheel 45 or to second gearwheel 50.

Thus, torque $M_A$ on the transmission output side is generated in torque determination unit 120 according to the following equation:

$$M_A = \frac{G_A I_A}{L_A} phi_A \qquad (3)$$

In reality, a certain amount of play is present in the drive train. In other words, at the zero crossing point of torque $M_A$ on the transmission output side, i.e., at the transition between the thrust phase and the drive phase, an angular jump in torsional angle $phi_A$ occurs according to the diagram in FIG. 4.

Figure 4:
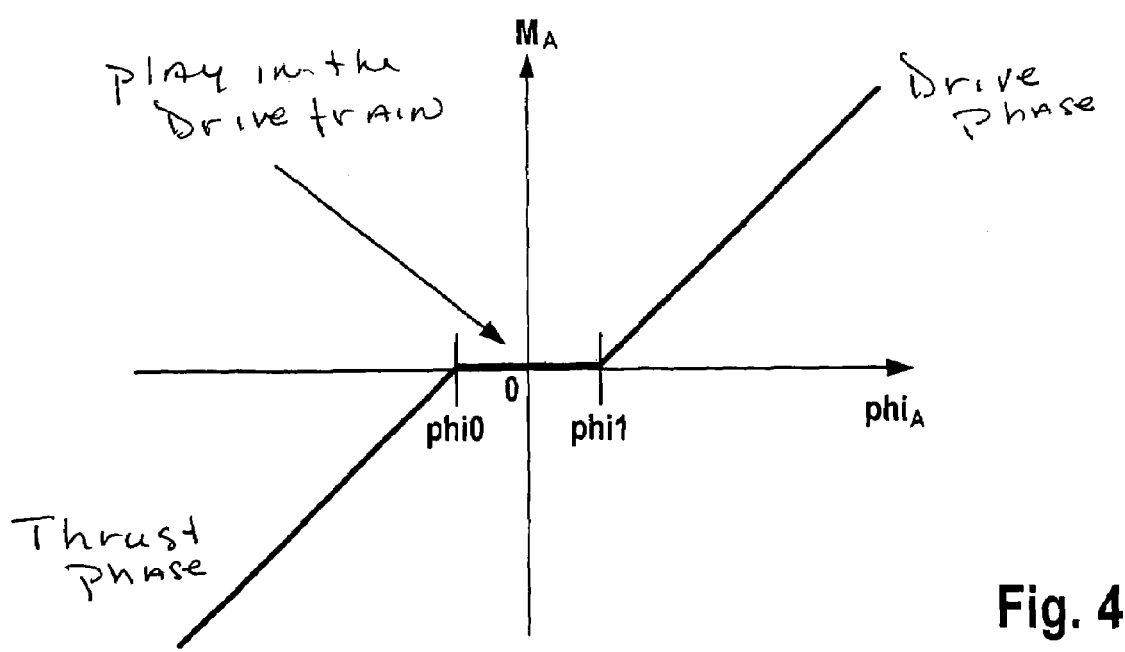
FIG. 4 shows a characteristic curve of a torque plotted against a torsional angle.

In FIG. 4, torque $M_A$ on the transmission output side is plotted against torsional angle $phi_A$ on the transmission output side in the form of a characteristic curve. In an thrust phase of vehicle 15, torque $M_A$ on the transmission output side is negative, and, according to proportionality constants $G_A * I_A / L_A$, is directly proportional to torsional angle $phi_A$ on the transmission output side. In a traction or drive phase of vehicle 15, torque $M_A$ on the transmission output side is positive, and, according to the same proportionality constants as in the thrust phase, is proportional to torsional angle $phi_A$ on the transmission output side. At the zero crossing point of torque $M_A$ on the transmission output side, however, torsional angle $phi_A$ on the transmission output side jumps from a negative first value phi0 to a positive second value phi1. This jump phi1−phi0 of torsional angle $phi_A$ on the transmission output side at the zero crossing point of torque $M_A$ on the transmission output side is dependent on the described play in the drive train. The relationship shown in FIG. 4, at least first torsional angle phi0 on the transmission output side and second torsional angle phi1 on the transmission output side, may be stored in a memory 125 in determination unit 80, so that in the case of a torsional angle $phi_A$ on the transmission output side, ascertained by subtraction device 115 and situated in the region between first torsional angle phi0 on the transmission output side and second torsional angle phi1 on the transmission output side, torque determination unit 120 automatically outputs a value of zero for torque $M_A$ on the transmission output side. For this purpose, torque determination unit 120 is of course connected to memory 125. The region of a torsional angle $phi_A$ on the transmission output side between first torsional angle phi0 on the transmission output side and second torsional angle phi1 on the transmission output side is referred to in this instance as the second region for torsional angle $phi_A$ on the transmission output side. For all other torsional angles $phi_A$ outside the second region, torque determination unit 120 generates torque $M_A$ on the transmission output side according to equation (3), this region of torsional angle $phi_A$ on the transmission output side outside the second region for torsional angle $phi_A$ on the transmission output side being referred to as the first region for torsional angle $phi_A$ on the transmission output side.

It is of further advantage when, according to FIGS. 2 and 3, for example, torsional angle $phi_A$ on the transmission output side is detected in engine control 65, and, therefore, in a single control unit. In this manner a uniform time basis may be used for determining torsional angle $phi_A$ on the transmission output side. This is important because, for the detection of torsional angle $phi_A$ on the transmission output side based on the phase displacement between the first phase and the second phase, generally only small time differences are measured between the corresponding phase signals. This may be relied on only if the corresponding phase signals are evaluated, preferably in a single device, based on a single uniform time basis.

If the phase displacements between the first phase signal and the second phase signal are disregarded during cornering of vehicle 15, it is sufficient for ascertaining $phi_A$ on the transmission output side by subtraction device 115 to simply subtract the third phase from the first phase, or the fourth phase from the first phase. Generation of an average value may then be omitted. In this case, the second phase fed to subtraction device 115 would correspond to the third or the fourth phase. As a further alternative, torque $M_A$ on the transmission output side may be ascertained by providing an additional gearwheel on transmission output shaft 10 or by using a gearwheel already present on transmission output shaft 10 in the region of differential 60, and ascertaining the torsional angle on the transmission output side solely via transmission output shaft 10 between the two gearwheels situated there. For ascertaining torque $M_A$ on the transmission output side, only transmission output shaft 10 is then considered, in the manner described according to FIG. 1, and in that case the wheel drive shafts do not play a role. Similarly, torque $M_A$ on the transmission output side may be ascertained using only one wheel drive shaft, or, to compensate for phase displacements resulting from cornering of vehicle 15, two wheel drive shafts 1, 5, it being necessary to provide first wheel drive shaft 1 and/or second wheel drive shaft 5 with an additional gearwheel. Thus, torque $M_A$ on the transmission output side may be ascertained either by the torsional angle between two gearwheels on first wheel drive shaft 1, or by the torsional angle between two gearwheels on second wheel drive shaft 5 in the manner described in FIG. 1 and according to equation (2). The torsional angle between two gearwheels on first wheel drive shaft 1 as well as between two gearwheels on second wheel drive shaft 5 may be ascertained to account for cornering of vehicle 15, and the two thus obtained torsional angles may be used to generate an average value from which torque $M_A$ on the transmission output side may then be generated according to equation (2).

The torque may be similarly determined according to the present invention for engine output shaft 95 and/or transmission input shaft 100 in the manner described in FIG. 1 and according to equation (2). However, the accuracy of any torque determination carried out using the principle according to FIG. 1 and equation (2) increases with a greater selected distance between the two gearwheels used for the torsional angle determination.

What is claimed is:

1. A method for operating a vehicle comprising:
   measuring a torsional angle at at least one drive shaft of the vehicle;
   ascertaining a torque transmitted via the at least one drive shaft as a function of the measured torsional angle;
   ascertaining a first phase at one transmission output shaft of the vehicle;
   ascertaining a second phase at at least one wheel drive shaft of the vehicle; and
   determining the torsional angle from a phase displacement between the first phase and the second phase.

2. A method for operating a vehicle comprising:
   measuring a torsional angle at at least one drive shaft of the vehicle;
   ascertaining a torque transmitted via the at least one drive shaft as a function of the measured torsional angle;
   ascertaining a first phase at one transmission output shaft of the vehicle;
   ascertaining a second phase at least one wheel drive shaft of the vehicle;
   determining the torsional angle from a phase displacement between the first phase and the second phase;
   ascertaining a third phase at a first wheel drive shaft of the vehicle;
   ascertaining a fourth phase at a second wheel drive shaft of the vehicle; and
   forming the second phase by averaging values of the third phase and the fourth phase.

3. The method according to claim 2, wherein a first wheel of the vehicle driven by the first wheel drive shaft is situated opposite a second wheel of the vehicle driven by the second wheel drive shaft.

4. The method according to claim 1, further comprising measuring at least one of the phases by a phase detector at a gearwheel on a corresponding drive shaft.

5. The method according to claim 1, wherein the transmission output shaft and at least two wheel drive shafts are rigidly connected to one another, via a differential.

6. The method according to claim 1, wherein the torque is ascertained proportional to the torsional angle in a first region of the torsional angle.

7. The method according to claim 1, further comprising assigning a fixed value for the torque to the torsional angle in a second region of the torsional angle.

8. The method according to claim 7, wherein the fixed value is zero.

9. The method according to claim 1, wherein the torque is ascertained from the torsional angle on a uniform time basis.

10. A device for operating a vehicle comprising:
    a torque detection unit for ascertaining a torque of the vehicle;
    a measuring device for measuring a torsional angle at at least one drive shaft of the vehicle; and
    an ascertainment unit for ascertaining the torque transmitted via the at least one drive shaft as a function of the measured torsional angle, the ascertainment unit further configured to
    ascertain a first phase at one transmission output shaft of the vehicle,
    ascertain a second phase at least one wheel drive shaft of the vehicle, and
    determine the torsional angle from a phase displacement between the first phase and the second phase.

* * * * *